United States Patent
Goennheimer et al.

(10) Patent No.: US 12,147,531 B2
(45) Date of Patent: Nov. 19, 2024

(54) PARALLEL EXECUTION OF A SET OF AUDITED PRIVILEGED ACTIONS ACROSS WORKER NODES

(71) Applicant: SAP SE, Walldorf (DE)

(72) Inventors: Joachim Goennheimer, Walldorf (DE); Sven Sterbling, Boblingen (DE)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 17/983,828

(22) Filed: Nov. 9, 2022

(65) Prior Publication Data

US 2024/0152600 A1    May 9, 2024

(51) Int. Cl.
*G06F 21/53* (2013.01)
*G06F 21/62* (2013.01)

(52) U.S. Cl.
CPC .......... *G06F 21/53* (2013.01); *G06F 21/6218* (2013.01); *G06F 2221/034* (2013.01)

(58) Field of Classification Search
CPC ................ G06F 21/53; G06F 21/6218; G06F 2221/034; G06F 9/5072
See application file for complete search history.

(56) References Cited

U.S. PATENT DOCUMENTS 8,321,558 B1 * 11/2012 Sirota .................... G06F 9/5011
                                                          718/1
2015/0304182 A1 * 10/2015 Brodsky ................. H04L 43/10
                                                          709/224

OTHER PUBLICATIONS

"European Application Serial No. 23203363.9, Extended European Search Report mailed Mar. 15, 2024", 10 pgs.
"GitHub—mej/nhc: LBNL Node Health Check", [Online]. Retrieved from the Internet: <URL: https://web.archive.org/web/20220120124424/https://github.com/mej/nhc>, (Jan. 20, 2022), 1-61.
"Operator pattern", Kubernetes, [Online]. Retrieved from the Internet: <URL: https://kubernetes.io/docs/concepts/extend-kubernetes/operator/>, (Accessed Mar. 28, 2024), 6 pgs.
"Slurm Workload Manager—Overview", [Online]. Retrieved from the Internet: <URL: https://slurm.schedmd.com/overview.html>, (Aug. 6, 2021), 1-6.
"Slurm Workload Manager Version 22.05—Fequently Asked Questions", [Online]. Retrieved from the Internet: <URL: https://slurm.schedmd.com/archive/slurm-22.05.3/faq.html>, (May 30, 2022), 1-55.
"Videos: Simple Linux utility for resource management", [Online]. Retrieved from the Internet: <URL: https://www.open-mpi.org/video/?category=slurm>, (May 20, 2019), 1 pg.
Jette, Morris, et al., "Architecture of the Slurm Workload Manager", JSSPP, LNCS 14283, (2023), 3-23.

* cited by examiner

*Primary Examiner* — Huan V Doan
(74) *Attorney, Agent, or Firm* — SCHWEGMAN LUNDBERG & WOESSNER, P.A.

(57) ABSTRACT

In an example embodiment, a solution is provided that provides parallel executions of privileged actions in an audited and secured way. This highly impacts the resiliency of applications because it allows for quick responses in outage situations and makes maintenance activities that could prevent the outages less cumbersome.

20 Claims, 6 Drawing Sheets

PARALLEL EXECUTION OF A SET OF AUDITED PRIVILEGED ACTIONS ACROSS WORKER NODES

TECHNICAL FIELD

This document generally relates to distributed cloud environments. More specifically, this document relates to the parallel execution of a set of audited privileged actions across an estate of worker nodes.

BACKGROUND

Container-orchestration systems, such as Kubernetes™, can be used to deploy, scale, and manage computer applications. In a container-orchestration system, an operator is a software component that handles lifecycle events of stateful applications. A control loop watches particular resources and reacts on state changes of these resources. In a Platform-as-a-Service offering, services, such as database services, may be defined as particular resources with subresources (e.g., containers, configurations, secrets). An operator watches for the particular service resource and, in the case of a create/update/delete event, takes the appropriate actions, such as creating, updating, or deleting subresources.

In Kubernetes™, the principle of least privilege means giving a user account or process only those privileges that are needed to perform its intended function. For example, a user account created for the sole purpose of creating backups does not need to install software, and hence it is only granted rights to run backup and backup-related applications. Any other privileges, such as installing new software, are blocked. This privilege also applies to a personal computer user who usually does work in a normal user account, but opens a privileged, password protected account only when the situation absolutely demands it.

An audit trail, also called an audit log, is a security-relevant chronological record, set of records, and/or destination and source of records that provides documentary evidence of the sequence of activities that have affected at any time a specific operation, procedure, event, or device. Audit records typically result from activities such as financial transactions, scientific research, and health care data transactions, or communications by individual people, systems, accounts, or other entities.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
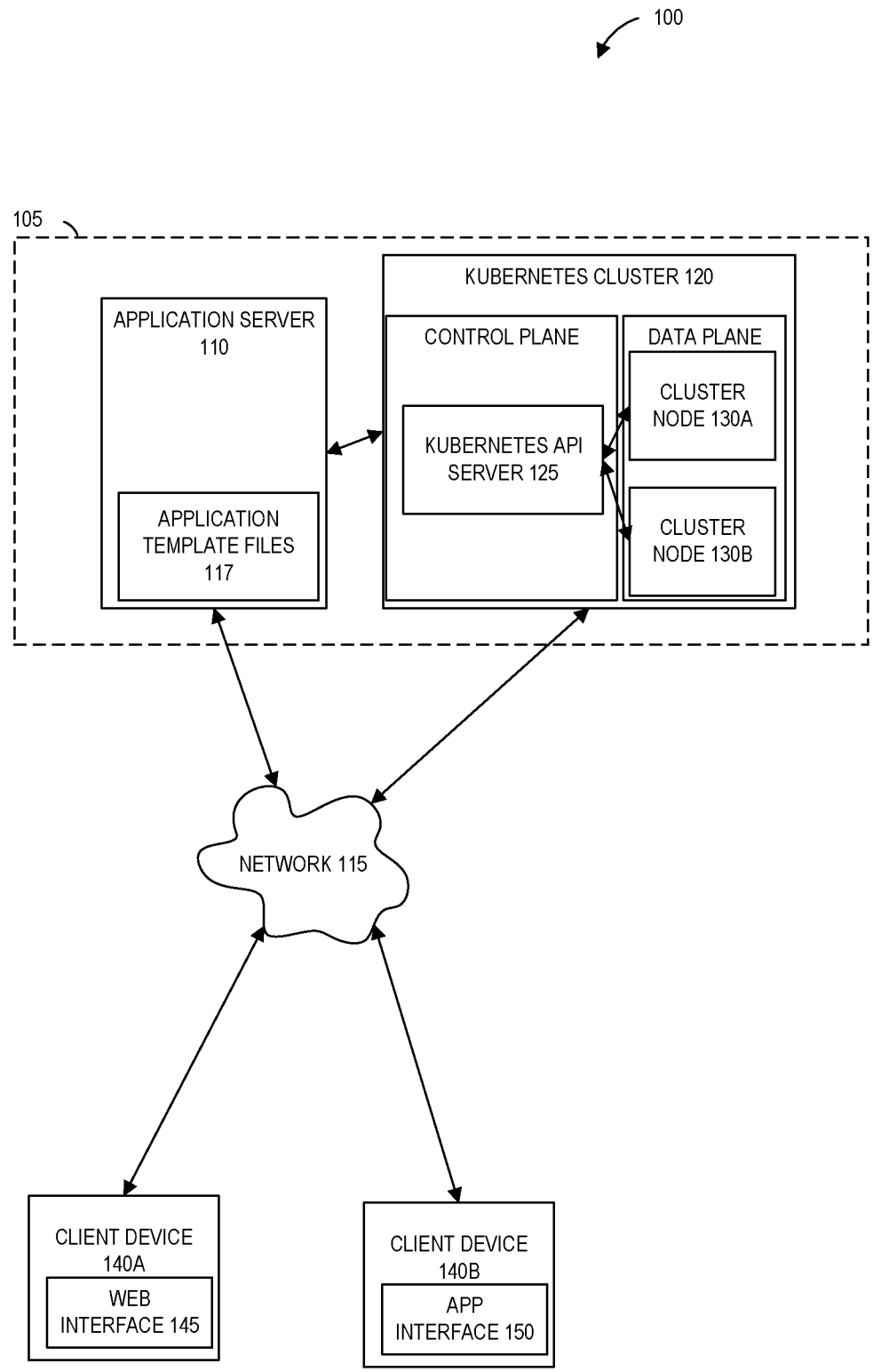
FIG. 1 is a network diagram illustrating a network environment suitable for using Kubernetes™ as a distributed operating system for a scalable application system, according to some example embodiments.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Certain types of cloud environments may be very complex. For example, a cloud-based database may be implemented through a series of complex operators and other components. When modifications need to be made to database components, such as through resetting or reconfiguring database components upon database feature failure, such modifications have the potentially risky outcome of causing an outage or even destroying system components. As such, it is beneficial to limit the scope of the commands performed based on privileges, but this can interfere with the ability to quickly address problems. For example, if an Information Technology (IT) specialist receives notification of a significant issue with a particular software feature in the middle of the night, and this particular software feature limits the ability of customers to access crucial data, there may not be time to receive appropriate approvals from higher-privileged users (e.g., supervisors) to perform particular actions that might be risky.

A privileged action in a container orchestration system, such as Kubernetes™, may be applied in database-specific scenarios, such as where an outage occurs in a distributed database involving a mis-configured volume resulting in data loss. One solution would be to only allow privileged actions to be performed on Kubernetes™ worker nodes that have been verified as having a mis-configured volumes running on them. This, however, requires a large amount of work as in order to perform the verification, one needs to authenticate oneself against every worker node that potentially mounted a faulty volume.

Another potential technical issue that can arise comes from the fact that it is difficult to guarantee flawless execution of security tools with auditing. If an upgrade of the security tool causes kernels on worker nodes to be broken, the absence of such a guarantee requires a drastic solution such as removing affected worker nodes one by one to move the workload to newer, unaffected worker nodes. This causes disruptions to the affected applications on the worker nodes. Furthermore, during that time all applications still on the broken worker nodes run in a degraded state.

A further potential technical issue is that access rights can wind up staying open for longer than needed, creating security concerns. For example, due to an erroneous process, access to configuration parameters of a critical node may wind up getting permanently assigned to a particular user rather than only temporarily assigned to that particular user, making it more likely a malicious user can obtain access to the critical node at a later time.

In an example embodiment, a solution is provided that provides parallel executions of privileged actions in an audited and secured way. This highly impacts the resiliency of applications because it allows for quick responses in outage situations and makes maintenance activities that could prevent the outages less cumbersome.

The benefits of this solution include that it ensures that all mitigative privileged actions have been executed, ensures that after execution all actions have been executed on all affected environments/worker nodes, ensures that the privileged actions have been triggered by an authenticated person/tool, allows the execution across hundreds of environments and worker nodes to be reliably audited, and ensures the principle of least privilege when executing privileged actions.

It should also be noted that the benefits of the solution may be felt extensively in large cloud environments that span multiple cloud providers and landscapes.

The solution allows the parallel and secure execution of privileged actions on a multitude of worker nodes in a cloud environment. The execution may be abstracted in a privileged execution custom resource (CR) that describes the following attributes:

(1) metadata about the execution (e.g., information for auditing)
(2) the target of the execution (e.g., a broad target or scope, such as a work group, taints/tolerations to select worker nodes, or a specific worker node, or a multiple of specific worker nodes)
(3) the command to execute on the targeted worker nodes
(4) the arguments that are passed to the commands that are executed
(5) information about the privilege level that the execution requires (e.g., a specified number range or more technically-based specifications, such as allowed Linux namespaces)

It should be noted that while Kubernetes™ will be discussed throughout this disclosure, the same techniques may be applied to achieve the same benefits using any containerized cloud environment, and the disclosure shall not be interpreted as limiting the scope of protection to Kubernetes™ unless explicitly recited.

Kubernetes™ is a system for automating deployment, scaling, and management of containerized applications. Application containerization is a virtualization method used by operating systems to deploy and run distributed applications without launching an entire virtual machine for each application.

Containerized applications have benefits over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

Containers, by virtue of being so modular, are quite conducive to scaling of in-memory database instances. Kubernetes™ pods are logical groupings of containers. Each pod is scheduled on a specific host and encapsulates a container for each of one or more applications. If the host becomes unavailable, Kubernetes™ automatically instantiates the instance on a different host, greatly easing maintenance.

A stateful service is one in which state data is persisted. An in-memory database may be used to persist the state for these stateful services, but they can be managed in Kubernetes™ clusters using an application programming interface (API) extension of a custom resource definition (CRD). A CRD is a set of parameters used by Kubernetes™ in managing the lifecycle of Kubernetes™ objects, such as pods. In an example embodiment, stateful applications managed by Kubernetes™ custom resources are utilized with the behavior toggles. That is, the lifecycle of the stateful application is managed by a custom resource and its controller. This concept is known as a Kubernetes™ operator.

Lifecycle of the application would include provisioning and decommissioning application instances, as well as any configuration changes of the applications other than actually using the application.

Docker™ is a tool for creating, deploying, and running applications using containers.

Custom resources are places where configuration parameters are stored and are each files managed by an operator component. This file contains various information about the installation, including an application programming interface (API) version (which is actually the version of the configuration file) and an application kind (e.g., database, plugin, operator), as well as various other status fields. These API version and kind fields are an important concept of Kubernetes resources. They are key to a certain type of resource that can be managed by a controller. Kubernetes installations include certain resources, such as Pod, Deployment, Service, and Ingress, and also allow for custom resources, introduced by the use of the Kubernetes Operator Framework.

Custom resources are defined by a custom resource definition (CRD) and managed by a controller. Any custom resources created in a Kubernetes cluster have to specify the key to the resource definition it fulfils (API version and kind). If the key is known in the cluster, the resource will be checked against the resource definition. If it complies, then it gets created and the controller of that resource type will reconcile the resource (e.g., read its content and perform the work to create a state in the cluster that was described by that resource). A controller gets registered in the cluster as being able to reconcile a specific resource type identified by API version and kind.

A human or machine can trigger the execution of a privileged action by creating a privileged execution CR and applying it to the API server of the clusters. The human may be, for example, a user such as an IT professional who has a particular privilege level that is not typically high enough to perform the command or at least not high enough to perform the command at an unlimited scale (e.g., the IT professional may have privilege enough to perform the command on a single node but not on all nodes). The API server then persists the CR and informs subscribed components about the state of it.

A privileged execution operator and auditing system operator both watch for privileged execution CRs and reconcile them. When the privileged execution operator sees a privileged execution CR that has not been executed yet, it creates the necessary custom privileged execution environments within the targeted worker nodes. These environments are custom in the sense that they only provide the privileges that correspond to the given privilege level and the privileges of the human/machine who wants to execute the action. It therefore denies execution if either the privilege level determined in the privileged execution resource is insufficient for the execution, or the privilege level of the human/machine is insufficient to create a custom privileged execution environment with the privilege level specified in the privileged execution CR. An auditor (e.g., a manager with high privilege levels) has the ability to grant a particular user the necessary privileges to execute such an action, even though the user normally would not have that privilege.

After finishing the execution of the privileged action on the worker node, the privileged execution operator removes the results of the execution and writes them into the privileged execution CR, and removes the custom privileged execution environment from the worker node.

The auditing system operator then monitors the state of the privileged execution CR and regularly updates the auditing system accordingly. When the execution of the action on a worker node is finished, it reports the execution results (which have been written into the privileged execution CR by the privileged execution operator) to the auditing system. After the execution is finished for all target environments, and all auditing requirements have been fulfilled, the auditing system operator deletes the privileged execution CR. No other component/human has the privileges to delete a privileged execution CR but the auditing system operator. This ensures that the audit trail is always complete and that all regulatory and compliance requirements are fulfilled at any time.

FIG. 1 is a network diagram illustrating a network environment 100 suitable for using Kubernetes™ as a distributed operating system for a scalable application system, according to some example embodiments. The network environment 100 includes a network-based application 105, client devices 140A and 140B, and a network 115. The network-based application 105 is provided by an application server 110 in communication with a Kubernetes cluster 120. The application server 110 accesses application template files 117 to configure and deploy an application to the Kubernetes™ cluster 120 via the Kubernetes™ API server 125 interacting with a set of cluster nodes 130A, 130B. The containerized application is provided to the client devices 140A and 140B via a web interface 145 or an application interface 150. The application server 110, the Kubernetes™ API server 125, the cluster nodes 130A and 130B, and the client devices 140A and 140B may each be implemented in a computer system, in whole or in part, as described below. The cluster nodes 130A and 130B may be referred to collectively as the cluster nodes 130 or generically as a cluster node 130. The client devices 140A and 140B may be referred to collectively as client devices 140 or generically as a client device 140.

The application server 110 provides a user interface for selecting an application to the client devices 140. The Kubernetes™ API server 125 provides an interface to the Kubernetes™ cluster 120 and deploys applications to the cluster nodes 130. The selected application may be invoked via a virtual system application. The client device 140 may provide identifying information to the application server 110, and the identifying information may be used by the Kubernetes™ API server 125 or the virtual system application to determine a particular instance of the selected application to invoke.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110, the Kubernetes™ API server 125, the cluster nodes 130A-130B, and the client devices 140A-140B may be connected by the network 115. The network 115 may be any network that enables communication between or among machines, databases, and devices. Accordingly, the network 115 may be a wired network, a wireless network (e.g., a mobile or cellular network), or any suitable combination thereof. The network 115 may include one or more portions that constitute a private network, a public network (e.g., the Internet), or any suitable combination thereof.

Figure 2:
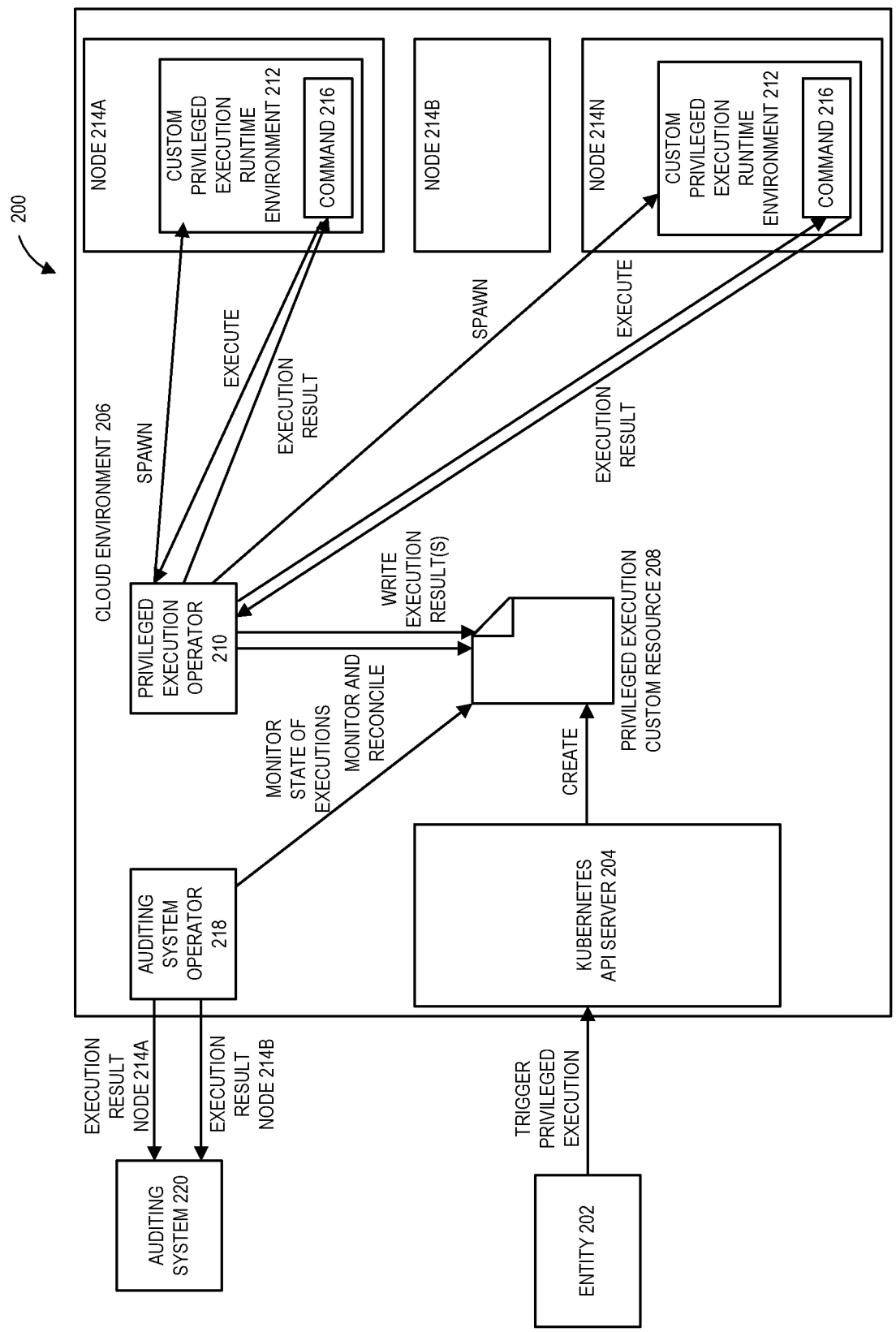
FIG. 2 is a block diagram illustrating a system, in accordance with an example embodiment.

FIG. 2 is a block diagram illustrating a system 200, in accordance with an example embodiment. Here, an entity 202 may trigger a privileged execution on a Kubernetes™ API server 204 within a cloud environment 206. The entity 202 may be, for example, a human or a machine. The Kubernetes™ API server 204 then creates a privileged execution custom resource 208. The privileged execution custom resource 208 is a configuration file that describes the privileged commands that should be executed and also specifies the target nodes for execution. It operates as a sandbox-like environment that has exactly the required privileges to run the required commands.

A privileged execution operator 210 then watches for privileged execution custom resources, such as privileged execution custom resource 208, and, upon detecting them, prepares a custom privileged execution environment 212 on one or more nodes 214A-214N that have been specified as a target node in the detected privileged execution custom resource 208. Here, for example, nodes 214A and 214N have been specified as target nodes. The privileged execution operator 210 is a controller that orchestrates the execution of privileged actions. It also then executes the commands, such as command 216, and stores the results of the execution back to the privileged execution custom resource 208.

After execution, the custom privileged execution runtime environment 212. More particularly, the custom privileged execution runtime environment 212 is designed to automatically destroy itself once the command has been executed and results reported.

The nodes 214A-214N are worker nodes, and each target worker node 214A, 214N may have a custom privileged execution environment 212 corresponding to the privileged execution custom resource 208, with the custom privileged execution environment 212 having only the necessary privileges for the requested actions, and may execute the privileged actions in a secure environment.

Furthermore, fine-granular privilege levels may be generated based on role-based access control specifications that follow the principle of least privilege.

An auditing system operator 218 then monitors the state of executions of the privileged execution custom resource 208, and reports the execution result(s) to the auditing system 220. The auditing system operator 218 is an independent controller that ensures audit logs get stored away, based on the status of the privileged execution custom resource 208.

Notably, here nodes 214A and 214N both are listed as target nodes in the privileged execution custom resource 208; then the command 216 may be executed on both in parallel, and their corresponding execution results can be monitored and reported to the auditing system 220 by the auditing system operator 218.

It should be noted that it is not necessary that the nodes 214A, 214N be specifically listed as target nodes in the privileged execution custom resource 208. Indeed, it is possible to merely specify some parameter or parameters that can be used to determine that nodes 214A, 214N are the target nodes. For example, nodes 214A, 214N may be associated with a particular worker group named "observability" and the privileged execution custom resource 208 merely lists the observability worker group as a target, as in the example below.

The following is an example of a privileged execution custom resource, in accordance with an example embodiment:

```
kind: PrivilegedExecution
metadata:
    name: privilegedexecution.privileged.domain.com
spec:
    targets:
        workergroups:
            - observability
    commands:
        - command 1
          args: [arg1, arg2, arg3]
        - command 2
          args: [arg1, arg2, arg3]
    privilegeLevel: 2
```

Figure 3:
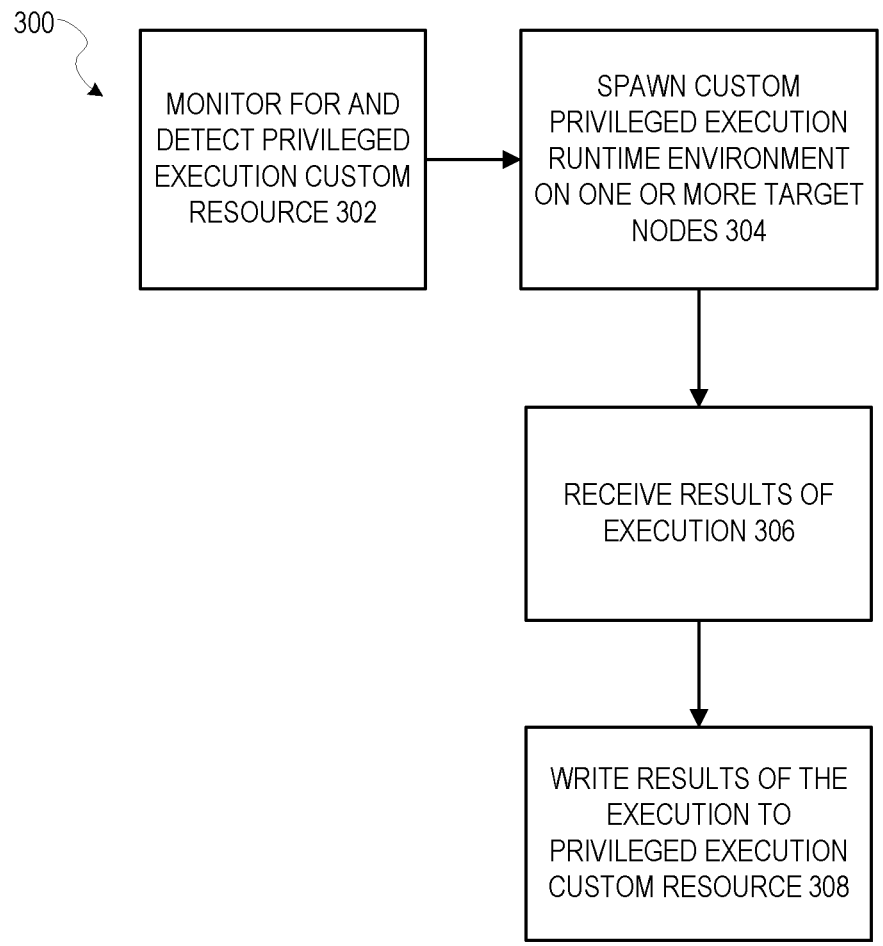
FIG. 3 is a flow diagram illustrating a method of performing a command, in accordance with an example embodiment.

FIG. 3 is a flow diagram illustrating a method 300 of performing a command, in accordance with an example embodiment. Here, the method 300 may be performed by, for example, a privileged execution operator 210 in a cloud environment 206. At operation 302, the privileged execution operator 210 monitors for and detects a privileged execution custom resource. The privileged execution custom resource may have been created by a Kubernetes™ API server, in response to an entity triggering a privileged execution. The trigger may be a software process, or alternatively can be an electronic or mechanical signal.

At operation 304, a custom privileged execution runtime environment is spawned on one or more target nodes, in a manner such that one or more commands specified in the privileged execution custom resource get executed automatically in the one or more target nodes. The one or more target nodes may be obtained from, or deduced from, the privileged execution custom resource. The custom privileged execution runtime environment is also designed to automatically report the results of execution and any metadata related to execution (e.g., components affected, timestamps, etc.) to the privileged execution operator 210.

At operation 306, the results of the execution are received by the privileged execution operator 210. While not pictured here, at this point the custom privileged execution runtime environment then terminates itself from each of the one or more target nodes (once the one or more commands have been executed on each and the results reported). In an example embodiment, each custom privileged execution runtime is designed to automatically terminate itself once it has completed execution of all the specified commands and reported the results of the execution back to the privileged execution operator 210.

At operation 308, the results of the execution are written to the privileged execution custom resource.

In other parlance, the privileged execution operator 210 is continuously monitoring for and detecting privileged execution custom resources and, upon detection of one, attempting to reconcile a desired state specified in the privileged execution custom resource with a current state. For example, the desired state might be the completion of execution of a series of commands. If the current state does not match that desired state (e.g., the execution of the series of commands has not been completed), then it may take steps to cause that desired state to occur, such as by performing operation 304 above. Once the results of the execution are written to the privileged execution custom resource at operation 308, the privileged execution custom resource has been reconciled because the current state matches the specified desired state.

Figure 4:
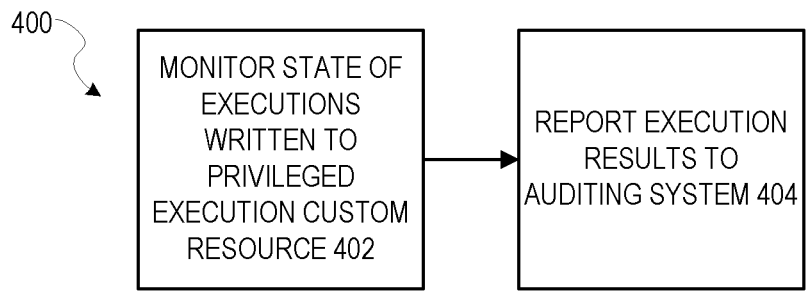
FIG. 4 is a flow diagram illustrating a method of performing auditing of execution of commands in a privileged execution custom resource, in accordance with an example embodiment.

FIG. 4 is a flow diagram illustrating a method 400 of performing auditing of execution of commands in a privileged execution custom resource, in accordance with an example embodiment. Here, the method 400 may be performed by, for example, an auditing system operator 218. At operation 402, the state of executions written to a privileged execution custom resource are monitored. At operation 404, the results of the execution are reported to an auditing system.

It should be noted that the term "results" in this context refers to the outcome of the execution as well as any metadata regarding the execution itself that was reported by the corresponding custom privileged runtime environment(s). This metadata may include, but is not limited to, who performed the command, when the command was executed (e.g., a timestamp), the target node on which it was executed, the privilege level, and whether the command was approved by another party.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1

A system comprising:
  at least one hardware processor; and
  a computer-readable medium storing instructions that, when executed by the at least one hardware processor, cause the at least one hardware processor to perform operations comprising:
    monitoring, by a privileged execution operator in a container orchestration system cloud environment, a privileged execution custom resource created in the container orchestration system cloud environment by an application programming interface (API) server upon receipt of a trigger for privileged execution of one or more commands;
    identifying one or more target nodes of the container orchestration system cloud environment based on the privileged execution custom resource;
    spawning a custom privileged execution runtime environment on each of the one or more target nodes, the custom privileged execution runtime environment designed to automatically execute the one or more commands and report results of the execution;
    receiving results of the execution from the custom privileged execution runtime environment on each of the one or more target nodes; and writing the execution results to the privileged execution custom resource.

Example 2

The system of Example 1, wherein the execution of the one or more commands occurs at a privilege level specified in the privileged execution custom resource.

Example 3

The system of Examples 1 or 2, wherein the operations further comprise:
monitoring, by an auditing system operator, states of executions in the privileged execution custom resource; and
reporting execution results written to the privileged execution custom resource to an auditing system.

Example 4

The system of Example 3, wherein the execution results include a timestamp of when each of the one or more commands was performed on each of the one or more nodes.

Example 5

The system of any of Examples 1-4, wherein each of the nodes is a worker node.

Example 6

The system of any of Examples 1-5, wherein the trigger for privileged execution of one or more commands is received from a human user.

Example 7

The system of any of Examples 1-6, wherein the trigger for privileged execution of one or more commands is received from a software process.

Example 8

A method comprising:
monitoring, by a privileged execution operator in a container orchestration system cloud environment, a privileged execution custom resource created in the container orchestration system cloud environment by an application programming interface (API) server upon receipt of a trigger for privileged execution of one or more commands;
identifying one or more target nodes of the container orchestration system cloud environment based on the privileged execution custom resource;
spawning a custom privileged execution runtime environment on each of the one or more target nodes, the custom privileged execution runtime environment designed to automatically execute the one or more commands and report results of the execution;
receiving results of the execution from the custom privileged execution runtime environment on each of the one or more target nodes; and
writing the execution results to the privileged execution custom resource.

Example 9

The method of Example 8, wherein the execution of the one or more commands occurs at a privilege level specified in the privileged execution custom resource.

Example 10

The method of Examples 8 or 9, wherein the operations further comprise:
monitoring, by an auditing system operator, states of executions in the privileged execution custom resource; and
reporting execution results written to the privileged execution custom resource to an auditing system.

Example 11

The method of Example 10, wherein the execution results include a timestamp of when each of the one or more commands was performed on each of the one or more nodes.

Example 12

The method of any of Examples 8-11, wherein each of the nodes is a worker node.

Example 13

The method of any of Examples 8-12, wherein the trigger for privileged execution of one or more commands is received from a human user.

Example 14

The method of any of Examples 8-13, wherein the trigger for privileged execution of one or more commands is received from a software process.

Example 15

A non-transitory machine-readable medium storing instructions which, when executed by one or more processors, cause the one or more processors to perform operations comprising:
monitoring, by a privileged execution operator in a container orchestration system cloud environment, a privileged execution custom resource created in the container orchestration system cloud environment by an application programming interface (API) server upon receipt of a trigger for privileged execution of one or more commands;
identifying one or more target nodes of the container orchestration system cloud environment based on the privileged execution custom resource;
spawning a custom privileged execution runtime environment on each of the one or more target nodes, the custom privileged execution runtime environment designed to automatically execute the one or more commands and report results of the execution;
receiving results of the execution from the custom privileged execution runtime environment on each of the one or more target nodes; and
writing the execution results to the privileged execution custom resource.

Example 16

The non-transitory machine-readable medium of Example 15, wherein the execution of the one or more commands occurs at a privilege level specified in the privileged execution custom resource.

Example 17

The non-transitory machine-readable medium of Examples 15 or 16, wherein the operations further comprise:
monitoring, by an auditing system operator, states of executions in the privileged execution custom resource; and
reporting execution results written to the privileged execution custom resource to an auditing system.

Example 18

The non-transitory machine-readable medium of Example 17, wherein the execution results include a timestamp of when each of the one or more commands was performed on each of the one or more nodes.

Example 19

The non-transitory machine-readable medium of any of Examples 15-18, wherein each of the nodes is a worker node.

Example 20

The non-transitory machine-readable medium of any of Examples 15-19, wherein the trigger for privileged execution of one or more commands is received from a human user.

Figure 5:
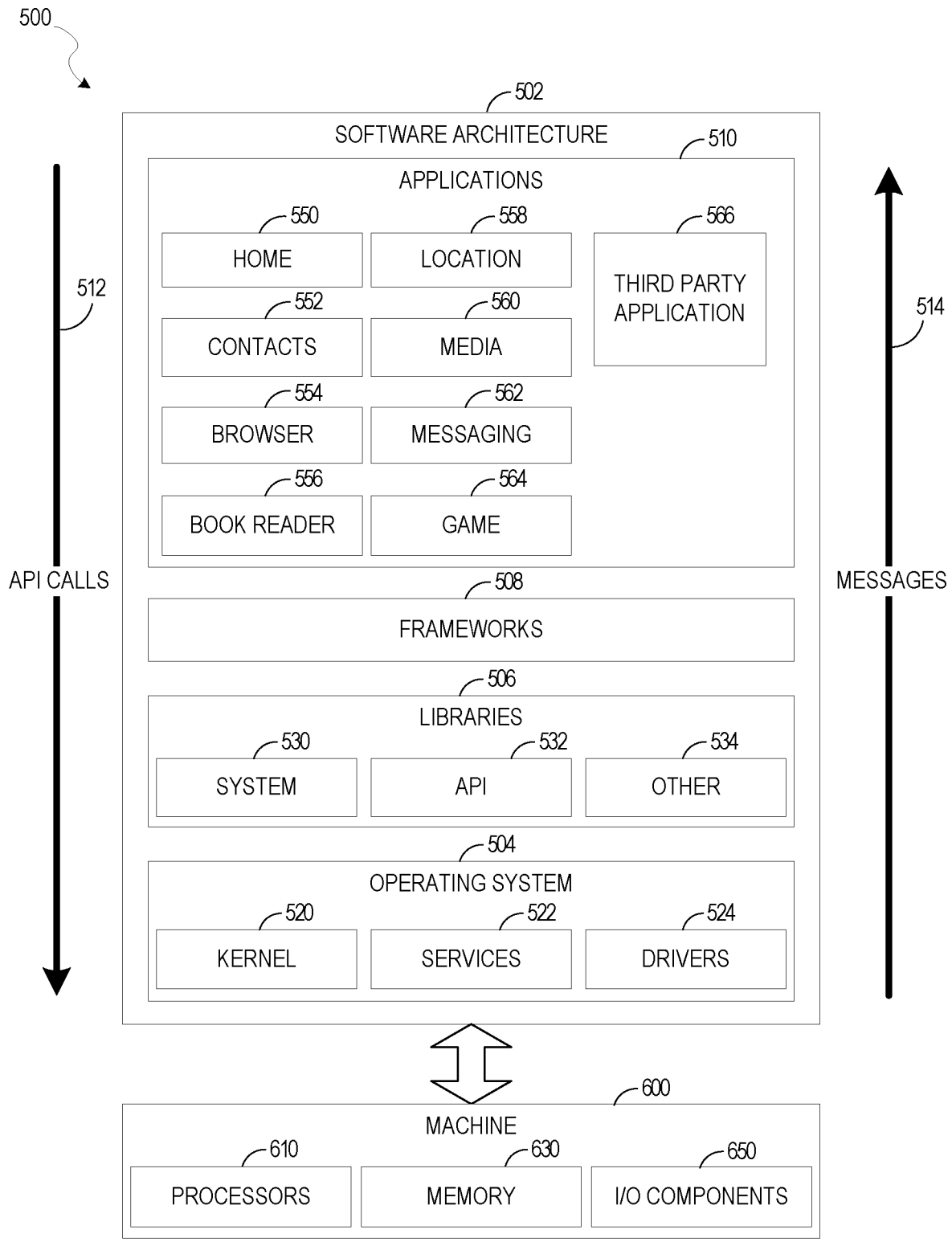
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 804 to facilitate functionality described herein.

Figure 6:
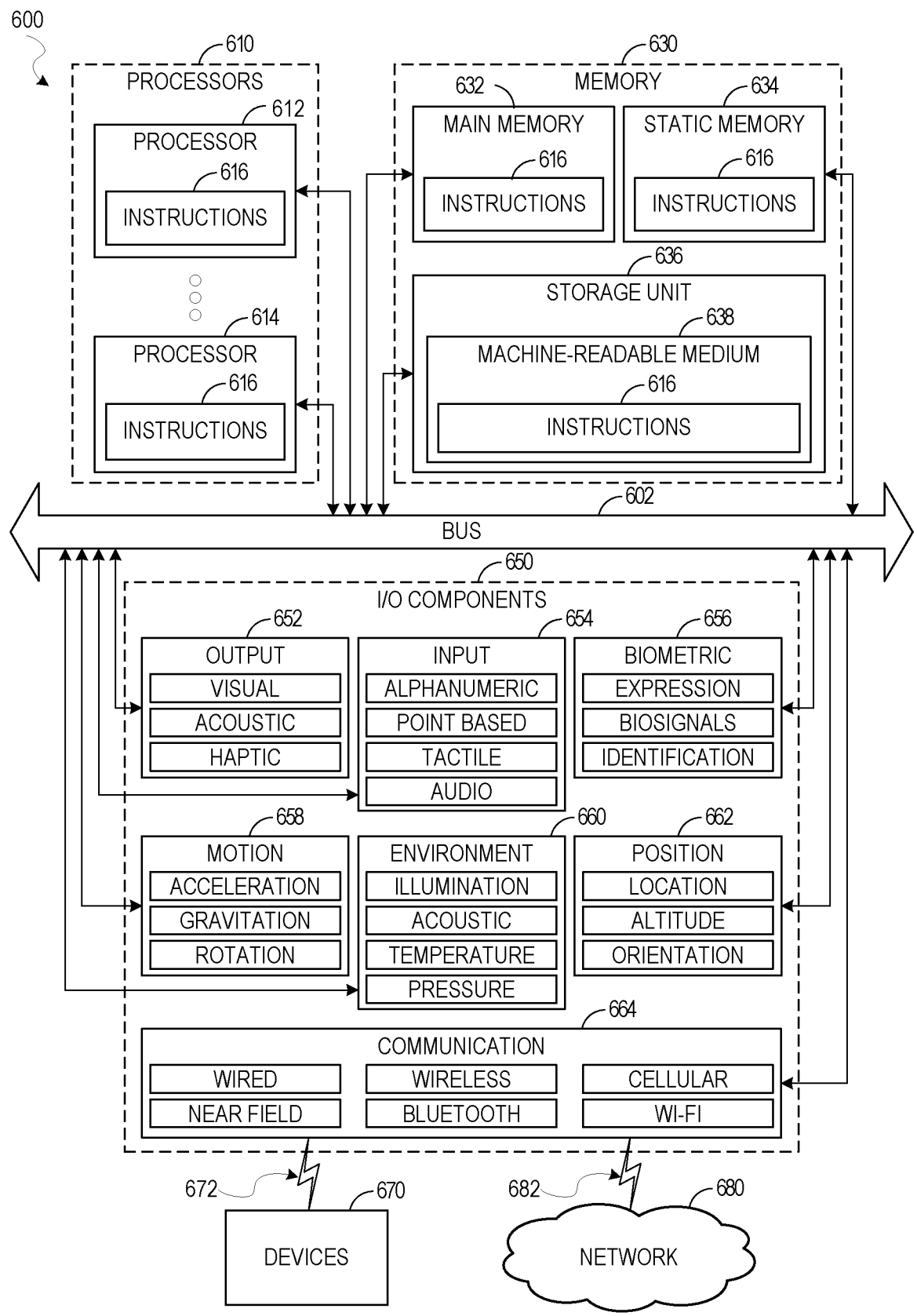
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIGS. 3 and 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via IP geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   monitoring, by a privileged execution operator in a container orchestration system cloud environment, a privileged execution custom resource created in the container orchestration system cloud environment by an application programming interface (API) server upon receipt of a trigger for privileged execution of one or more commands;

identifying one or more target nodes of the container orchestration system cloud environment based on the privileged execution custom resource;

spawning a custom privileged execution runtime environment on each of the one or more target nodes, the custom privileged execution runtime environment designed to automatically execute the one or more commands and report results of the execution;

receiving results of the execution from the custom privileged execution runtime environment on each of the one or more target nodes; and writing the execution results to the privileged execution custom resource.

2. The system of claim 1, wherein the execution of the one or more commands occurs at a privilege level specified in the privileged execution custom resource.

3. The system of claim 1, wherein the operations further comprise:

monitoring, by an auditing system operator, states of executions in the privileged execution custom resource; and reporting execution results written to the privileged execution custom resource to an auditing system.

4. The system of claim 3, wherein the execution results include a timestamp of when each of the one or more commands was performed on each of the one or more nodes.

5. The system of claim 1, wherein each of the nodes is a worker node.

6. The system of claim 1, wherein the trigger for privileged execution of one or more commands is received from a human user.

7. The system of claim 1, wherein the trigger for privileged execution of one or more commands is received from a software process.

8. The system of claim 1, wherein the trigger for privileged execution of one or more commands is a mechanical or electrical signal.

9. A method comprising:

monitoring, by a privileged execution operator in a container orchestration system cloud environment, a privileged execution custom resource created in the container orchestration system cloud environment by an application programming interface (API) server upon receipt of a trigger for privileged execution of one or more commands;

identifying one or more target nodes of the container orchestration system cloud environment based on the privileged execution custom resource;

spawning a custom privileged execution runtime environment on each of the one or more target nodes, the custom privileged execution runtime environment designed to automatically execute the one or more commands and report results of the execution;

receiving results of the execution from the custom privileged execution runtime environment on each of the one or more target nodes; and writing the execution results to the privileged execution custom resource.

10. The method of claim 9, wherein the execution of the one or more commands occurs at a privilege level specified in the privileged execution custom resource.

11. The method of claim 9, wherein the operations further comprise:

monitoring, by an auditing system operator, states of executions in the privileged execution custom resource; and reporting execution results written to the privileged execution custom resource to an auditing system.

12. The method of claim 11, wherein the execution results include a timestamp of when each of the one or more commands was performed on each of the one or more nodes.

13. The method of claim 9, wherein each of the nodes is a worker node.

14. The method of claim 9, wherein the trigger for privileged execution of one or more commands is received from a human user.

15. A non-transitory machine-readable medium storing instructions which, when executed by one or more processors, cause the one or more processors to perform operations comprising:

monitoring, by a privileged execution operator in a container orchestration system cloud environment, a privileged execution custom resource created in the container orchestration system cloud environment by an application programming interface (API) server upon receipt of a trigger for privileged execution of one or more commands;

identifying one or more target nodes of the container orchestration system cloud environment based on the privileged execution custom resource;

spawning a custom privileged execution runtime environment on each of the one or more target nodes, the custom privileged execution runtime environment designed to automatically execute the one or more commands and report results of the execution;

receiving results of the execution from the custom privileged execution runtime environment on each of the one or more target nodes; and writing the execution results to the privileged execution custom resource.

16. The non-transitory machine-readable medium of claim 15, wherein the execution of the one or more commands occurs at a privilege level specified in the privileged execution custom resource.

17. The non-transitory machine-readable medium of claim 15, wherein the operations further comprise:

monitoring, by an auditing system operator, states of executions in the privileged execution custom resource; and reporting execution results written to the privileged execution custom resource to an auditing system.

18. The non-transitory machine-readable medium of claim 17, wherein the execution results include a timestamp of when each of the one or more commands was performed on each of the one or more nodes.

19. The non-transitory machine-readable medium of claim 15, wherein each of the nodes is a worker node.

20. The non-transitory machine-readable medium of claim 15, wherein the trigger for privileged execution of one or more commands is received from a human user.

* * * * *